United States Patent Office 3,207,739
Patented Sept. 21, 1965

3,207,739
POLYMER CRYSTALLIZATION METHOD
Michael Wales, Walnut Creek, Calif., assignor to Shell Oil Company, New York, N.Y., a corporation of Delaware
No Drawing. Filed Apr. 26, 1962, Ser. No. 190,244
18 Claims. (Cl. 260—93.7)

This invention relates to an improved crystallization method for the production of composites of solid crystalline polymers with crystallization modifying additives. The method leads to the production of modified polymers having improved physical properties.

The invention relates more specifically to an improvement in a crystallization method for the production of shaped articles, and of resin composites suitable for use in producing shaped articles, from resins consisting substantially of crystallizable polymers, particularly those produced in the presence of low pressure catalysts of the Zeigler-Natta type. The invention is of outstanding advantage when used with isotactic polypropylene and will be illustrated largely with reference thereto.

Solid polypropylene is a new thermoplastic polymer which has recently achieved commercial importance. By use of appropriate conditions and catalysts it can be produced in a sterically regulated form known as isotactic polypropylene. It is difficult, if not impossible, to polymerize propylene to a polymer which has 100% isotactic structure. However, it is possible to produce, with commercially practical catalysts, polymers which have a high proportion of segments that are completely isotactic. A property which is associated with isotacticity of polypropylene is the capacity of a melt thereof to solidify in crystalline form.

Following conventional terminology, reference to "crystalline" or "isotactic" polymers means, unless the context indicates otherwise, solid polymers having a high degree of crystallinity or isotacticity, usually at least 50%, as determined by X-ray analysis or comparable methods. In general, polypropylene having a crystallinity of this order contains at most only a very small proportion of material which is extractable in boiling hydrocarbons such as gasoline boiling range hydrocarbons. Typically, the proportion of highly crystalline polypropylene which is extractable in boiling heptane or isooctane is less than 10% and usually less than 5%. Similarly, "crystallizable" polymers are those which have a molecular arrangement that enables them to solidify from a melt in a highly crystalline structure. The general practice in the art is to refer to "crystalline" or "crystallizable" polymer, rather than "partially crystalline" or "partially crystallizable" polymer, even though olefin polymers of 100 percent crystal structure are not known to exist. For example, a crystallinity of 70% is extremely high for isotactic polypropylene. Normally solid, crystalline polypropylene usually has a viscosity average molecular weight of at least about 40,000 and generally between 100,000 and 1,200,000. For convenience the molecular weight is usually expressed in terms of intrinsic viscosity. The intrinsic viscosity of polypropylene, measured in decalin at 150° C., is generally between 1.0 and 6 dl./g. but may be as low as 0.5 or less and as high as 10 or more.

Reference to "polymers" herein includes both homopolymers and copolymers unless the context indicates otherwise.

Crystalline polymers, in their usual form, have some outstandingly good properties and some undersirable ones. For example, desirable properties of highly crystalline polypropylene are high tensile strength and substantial hardness. One disadvantage of the usual forms of highly crystalline polypropylene is a lack of transparency or clarity, which shows up as haze in thin films and as translucency, decreasing to ultimate opacity, in articles of progressively increased thickness. Another disadvantage of the usual forms of highly crystalline polypropylene is a relatively low impact resistance. This handicaps the use of isotactic polypropylene for making vessels or containers which during use may be subject to mechanical shock.

Polypropylene, like many other crystalline polymers, crystallizes from a melt in a form in which the individual crystals are associated in spheroid or ellipsoid bodies known as spherulites. Generally, clarity and some mechanical properties of articles made from polypropylene are better when the spherulites are relatively small.

It has been proposed in the past to add certain finely divided insoluble solid materials, such as silica, to polyethylene to improve the clarity of the polymer. In another instance it has been proposed to add insoluble solids such as silica to improve polymer properties related to the rate of crystallite and spherulite growth. It has also been suggested to add related polymers.

It has now been found that certain members of an entirely different class of materials can be used as additives to modify the crystallization process and thereby provide substantial improvements in physical properties of solid polypropylene and in mechanical properties of articles produced therefrom, especially those properties which are related to crystallite and spherulite structure of the polymer. Similar improvements of other crystallizable polymers may be obtained by use of additives of the same type. In many instances minute amounts of the additives are extremely effective in modifying the crystallization process and crystal structure.

The preferred materials which result in the production of solid polypropylene of improved physical properties when used according to this invention are salts of sodium and of carboxylic or polycarboxylic acids selected from certain limited groups. Salts of the same acids with other metals from Groups Ia and IIa of the Periodic Chart of Elements, as illustrated in Handbook of Chemistry by Lange, 10th edition, 1961, pp. 56–57, may also provide the advantages of sodium salts, though generally to a substantially lesser degree. For brevity, this group of compounds will sometimes be referred to herein as "compounds of the type of sodium salts of carboxylic acids" or, more briefly, as "carboxylic acid salts." Effective compounds of this type are identified in detail hereinafter.

The improvements of this invention are obtained when a compound such as one of said sodium salts of carboxylic acids is present in dissolved or thoroughly dispersed form in the polymer melt prior to the final crystallization thereof by cooling.

It is a specific object of this invention to provide an improved crystallization method for the production of composites of polypropylene with crystallization modifying additives.

It is another specific object of this invention to provide articles of crystalline polypropylene which, by virtue of an improved crystal structure, have improved mechanical properties, particularly improved clarity, hardness, tensile properties and injection molding characteristics.

It is another object to provide an improved crystallization method for the production of composites of crystallizable polymers, such as linear polymers of alpha-monoolefins, with crystallization modifying additives.

Another object is to provide articles of crystalline polymers such as linear polymers of alpha-monoolefins which, by virtue of an improved crystal structure, have improved mechanical properties, particularly improved clarity, hardness, tensile properties and injection molding characteristics.

It is a major object of this invention to provide a novel method for causing crystallizable polypropylene to crystallize with a very fine spherulite structure.

Another object is to provide a novel method for causing crystallizable polymers to crystallize with a very fine spherulite structure.

Other objects will become apparent from the following description of this invention.

According to this invention, solid crystalline polypropylene and other similar solid crystalline polymers of substantially improved physical properties are prepared by carrying out at least the final crystallization from a melt comprising the normally solid, crystallizable polypropylene or other polymer, together with a small, effective amount of at least one of said compounds of the type of sodium salts of carboxylic acids.

In another aspect, this invention comprises improved articles of solid crystalline polypropylene or other similar solid crystalline polymers, prepared by crystallizing a melt of crystallizable normally solid polypropylene or other similar polymer, containing a small, effective amount of at least one of said compounds of the type of sodium salts of carboxylic acids.

Several properties of the articles produced from normally solid crystalline polymers according to this invention are improved thereby. The improvement will vary, depending on the particular polymer used, other additives used therewith, the particular compound selected from the group of compounds of the type of sodium salts of carboxylic acids, and the conditions under which the final solidification of the melt takes place.

Generally, it is found that the spherulite dimensions in the crystallized articles produced according to this invention are substantially smaller than they would be in an article produced in identical manner from the same polymer but without using one of said compound of the type of sodium salts of carboxylic acids.

It is also generally found that the clarity of film or of thicker shaped articles produced from compositions according to this invention is substantially improved, compared to that of articles produced in identical manner from the same polymer without one of said compounds of the type of sodium salts of carboxylic acids, particularly when the final cooling step is under non-flow conditions.

The modulus of elasticity of polymer produced according to this invention generally is increased over that of the identical polymer crystallized in identical manner without one of said compounds of the type of sodium salts of carboxylic acids. Similarly, tensile strength and other tensile properties are improved.

One of the advantages of this invention is that injection molding of polypropylene containing a carboxylic acid salt in accordance with this invention can be successfully carried out over a much wider range of temperature and pressure conditions than in the absence of crystallization modifying compounds. The area of a "molding diagram" for modified polymers, i.e., the area on the plot of cylinder temperaturre vs. ram pressure which covers satisfactory conditions, is over that obtained with unmodified polymer.

Another advantage is that the mixtures according to this invention solidify at a higher temperature than those of identical polymers not containing said compounds of the type of sodium salts of carboxylic acids. Hence, processing can generally be carried out in a shorter period of time. Another advantage of this invention is that it is possible to apply the process to highly crystalline polymers which have a relatively high melt index, allowing their being processed at lower temperatures.

It is further often found that impact resistance is greater in articles produced according to this invention than in those identically produced from identical polymer without one of said compounds of the type of sodium salts of carboxylic acids, particularly when the final cooling step is under non-flow conditions.

In the compounds of the type of group I and II metal salts of carboxylic acids, the preferred metal used is sodium. Its salts are found more effective, weight for weight, than tested salts of other metals having identical anions. Its salts are stable at the high temperatures which generally occur in the processing of polymer such as polypropylene. Its salts, in concentrations used in this invention do not promote decomposition or discoloration of crystalline olefin polymers to a significant extent. Some effectiveness in modifying the crystallization of linear polyolefin has been found, however, to reside in salts of potassium, calcium and magnesium with anions derived from carboxylic acids described hereinafter. Some crystal modification can also be obtained with similar salts of other metals of group I and II, particularly those of alkali metals and alkaline earth e.g., lithium, cesium, strontium and barium. However, not all salts of group I or II metals with carboxylic acids are effective in modifying the crystal structure of polypropylene upon cooling from a melt. Also, some salts, particularly those of calcium with aliphatic dicarboxylic acids, are subject to excessive deterioration under the influence of heat.

The carboxylic acids whose sodium salts are effective in accordance with this invention can be broadly classified into two main groups, one of which includes two sub-groups, as follows:

(A) Di- and polycarboxylic acids (sometimes referred to herein for brevity as dicarboxylic acid type compounds).
(B) Monocarboxylic acids which contain ring structures.
 (1) Monocarboxylic acids having the carboxyl group attached to a ring carbon atom (sometimes referred to herein, for brevity, as benzoic acid type compounds).
 (2) Monocarboxylic acids having the carboxyl group attached to an aliphatic carbon atom and a ring attached to another aliphatic carbon atom (sometimes referred to herein, for brevity, as arylalkanoic acid type compounds).

Suitable compounds of each of these groups, whose sodium or other Groups I or II metal salts are useful in this invention, are set out below. In general, salts of acids from group B(1) are most preferred for use in this invention, and those of acids from group A least preferred. However, the effectiveness of individual members of each group varies.

Sodium salts and other alkali and alkaline earth metal salts of carboxylic acids are a well known group of chemicals. The sodium salts which are used according to this invention may be represented by the general formula $Na_mX$ where $m$ is the valence of X, and X is the carboxylic acid anion, selected from the group of carboxylic acids listed below.

More broadly, salts which can be used have the formula $M_mX_n$, where M is a metal from group I or IIa, X is the carboxylic acid anion, selected from the group of carboxylic acids disclosed below, and $m$ and $n$ are integers selected such that the ratio $m:n$ is the same as the ratio of the valence of X to the valence of M.

A. DICARBOXYLIC ACID TYPE COMPOUNDS

The group of dicarboxylic acid type compounds whose sodium salts may be used in accordance with this invention includes saturated aliphatic dicarboxylic acids, preferably having at least 4 carbon atoms per molecule, saturated cycloaliphatic dicarboxylic acids and aromatic dicarboxylic acids. Among the dicarboxylic acid salts those of acids having up to 12 carbon atoms per molecule are generally preferred. The following are illustrative:

Sodium salts of acids of 4 to 12 carbon atoms, e.g., of succinic, glutaric and adipic acid and with those of the higher acids having even numbers of carbon atoms per molecule, such as suberic, sebacic, and tetramethyladipic acid.

Sodium salts of saturated cycloaliphatic dicarboxylic acids, such as cis-1,4-cyclohexanedicarboxylic acid, 1,2- cyclohexanedicarboxylic acid and 1,1-cyclohexanedicarboxylic acid.

Sodium salts of orthophthalic acid, metaphthalic acid and tetramethylterephthalic acid.

Sodium salts of other dicarboxylic acids, e.g., of aryl-substituted aliphatic dicarboxylic acids such as paraxylyl succinic acid and 3-phenylbutanedicarboxylic acid.

Sodium salts of polycarboxylic acids having more than two carboxylic acid groups per molecule, e.g., of pyromellitic acid.

B(1). BENZOIC ACID TYPE COMPOUNDS

The group of benzoic acid type acids whose sodium salts may be used in accordance with this invention includes benzoic acid itself, hexahydrobenzoic acid (cyclohexanecarboxylic acid), and substituted benzoic and hexahydrobenzoic acids. All the acids of this group have in common that they are carbocyclic monocarboxylic acids whose carboxyl group is attached to a carbocyclic nucleus, which may be aromatic or aliphatic. The group of benzoic acid type compounds further includes heterocyclic monocarboxylic acids whose carboxyl group is attached to a ring carbon atom.

Suitable substituted benzoic, hexahydrobenzoic and heterocyclic acids include those having one or more hydrocarbon groups substituted on the nucleus. Preferred are those with 1 to 6 carbon atoms per substituent group, preferably those with alkyl substituents; cycloalkyl and aryl substituents may also be present. Typical useful alkyl substituted benzoic acids are o-methylbenzoic acid, p-methylbenzoic acid, p-ethylbenzoic acid, p-isopropylbenzoic acid, p-tert.butylbenzoic acid and o-tert.butylbenzoic acid. The sodium salts of benzoic and itself and of para-alkyl substituted benzoic acids are particularly preferred. Improvements which are generally of a lower order of magnitude are obtained with sodium salts of benzoic acids having two or more alkyl substituents in the nucleus, such as 2,4-dimethyl benzoic acid and 2,4,6-trimethylbenzoic acid. Improvements of a lower order are also obtained with sodium salts of benzoic acids having relatively large alkyl substituent groups such as, for example, p,n-heptylbenzoic acid. Benzoic acids whose sodium salts are effective may also have the acid carrying benzene ring condensed with another benzene ring, such as in alpha naphthoic acid, or they may have a cyclohexyl ring substituted on the benzene ring, as in p-cyclohexylbenzoic acid.

Sodium salts of alicyclic compounds corresponding to the above aromatic compounds can be used. Suitable carbocyclic acids are, for example, cyclohexane carboxylic acid, 1-methylcyclohexane carboxylic acid, cis-4-tert.butylcyclohexane carboxylic acid, cis-4-neopentyl-cyclohexane carboxylic acid, trans-4-methylcyclohexane carboxylic acid and trans-4-tert.butyl cyclohexane carboxylic acid. Heterocyclic acids include 2-furane carboxylic acid (pyromucic acid) and gamma-pyridine carboxylic acid (isonicotinic acid).

Also useful are sodium salts of cyclic monocarboxylic acids containing a polar group or atom substituted on the nucleus, e.g., a hydroxy-, alkoxy-, amino- or esterified carboxyl-group or a halogen atom. These polar groups or atoms may occur on the nucleus either as the sole substituent or together with one or more hydrocarbon group substituents. Generally, the sodium salts of those compounds in which a substituent is para to the carboxyl group are the most effective. Typical examples of this group are: m-hydroxybenzoic acid, p-hydroxybenzoic acid, o-chlorobenzoic acid, p-chlorobenzoic acid, m-nitrobenzoic acid, 3,5-dinitrobenzoic acid, o-aminobenzoic acid, p-aminobenzoic acid, p-acetamidobenzoic acid, o-formylbenzoic acid and p-methoxybenzoic acid. Less effective are salicylic acid (o-hydroxybenzoic acid), o-mercaptobenzoic acid, m-chlorobenzoic acid, p-nitrobenzoic acid, 3-methylsalicylic acid, dichlorosalicylic acid, 2,5-dichlorosalicylic acid, 2,5-dihydroxybenzoic acid and 3,5-dihydroxybenzoic acid.

B(2). ARYLALKANOIC ACID TYPE COMPOUNDS

The group of arylalkanoic acid type compounds whose sodium salts may be used in accordance with this invention includes as preferred group aryl alkanoic acid salts. Particularly preferred and typical compounds are salts of monophenylacetic acid and diphenylacetic acid.

The effective arylalkanoic acid type compounds may be designated terminal aliphatic monocarboxylic acids substituted with at least one carbocyclic group per molecule. The preferred acids contain from 8 to 25 carbon atoms, including from 1 to 4 carbon atoms in the alkyl group attached to the carboxyl group. Said carbocyclic groups may be aryl, aralkyl, arylalkenyl, cycloalkalkyl or cycloalkalkenyl groups. The acids may contain as further substituents aliphatic hydrocarbon groups; the acids may be substituted with hydroxyl groups, amino groups or halogen atoms.

The following compounds are illustrative of this group: Sodium salts of phenyl acetic acid, diphenyl acetic acid, beta,beta-diphenylpropionic acid and beta-phenyl-beta-methylbutyric acid.

Sodium salts of alpha-phenyl-alpha-methylpropionic acid, beta,beta,beta-triphenylpropionic acid, beta,beta,beta-tri(p-tert.butylphenyl)propionic acid, and beta-p-tolyl-beta-methylbutyric acid.

Other suitable acids of this group carry hydroxyl, amino or halogen substitution in the aliphatic chain as in beta, beta-di(p-tert.butylphenyl)-alpha-hydroxypropionic acid and in benzilic acid (diphenylglycolic acid).

Cycloalkyl substituted alkanoic acids include, for example, cyclohexylacetic acid, beta-cyclohexylpropionic acid and beta-cyclohexylbutyric acid.

The carboxylic acid salts used are effective in very low concentrations and are preferably used in such low concentrations. Suitable concentrations are in the range from 0.0001 to 2 percent by weight. A preferred lower concentration limit is at about 0.001 percent. The most effective compounds are preferably employed in concentrations below 0.5 percent, e.g., between 0.001 and 0.3 or up to 0.5 percent. Other compounds may be used in amounts up to 1 percent. Although still higher concentrations may be used no further benefit of the kind described is generally obtained thereby.

The process of this invention may be carried out with a single crystallization modifying compound of the type described, or with a mixture of two or more of such compounds.

If desired, other additives may be present in the olefin polymer. Crystallization modifying additives of other types may be added. Other additives, which are conventionally added, include antioxidants, stabilizers against ultraviolet radiation, and the like. They may be added at any convenient stage of processing.

The present invention is advantageous when used with clear, unpigmented, unfilled polymers. However, the additives of this invention are also compatible with conventional fillers and pigments.

While this invention is most advantageous in providing improved articles of crystalline polypropylene it may also be employed with advantage in improving products made from other crystallizable hydrocarbon polymers, particularly alpha-olefin polymers and copolymers. Specific examples are linear polymers of ethylene, 1-butene, 4-methyl-1-pentene, and 1-hexene, crystalline copolymers of propylene with ethylene, 1-butene and the like, and crystalline polystyrene. Particularly desirable improvements are obtained, for example, in block polymers, such as those consisting predominantly of isotactic polypropylene having small amounts of ethylene, e.g., between 1 and 10 percent, copolymerized therewith by block polymerization. A preferred group are isotactic polymers of alpha-monoolefins having at least 3 and up to 8 carbon atoms per molecule. Polymers of alpha-monoolefins having from 2 to 4 carbon atoms are another preferred group.

Polymers which can be improved according to this invention have molecular weights and crystallinities in the range described above for polypropylene.

In one mode of practicing this invention, elastomeric polymer is added to the polyolefin as a property-modifying additive, together with a carboxylic acid salt. The addition of elastomers is known to confer an improvement in some of the mechanical properties of crystalline polymers, e.g., the impact strength. Suitable elastomers include copolymers of ethylene with alpha olefins such as propylene or 1-butene, or other elastomeric olefin copolymers. Other elastomers may be used, such as polyisobutylene, Butyl rubber, butadiene-styrene copolymer (SBR), butadiene-acrylonitrile copolymer (NBR), polybutadiene or polyisoprene of high cis-1,4 content, and the like. The elastomers which are added preferably have weight average molecular weights in excess of 50,000, suitably from 100,000 to 500,000. Elastomer may be added in concentrations up to 35 percent by weight, preferably between 3 and 15 percent.

The polymers which are modified according to this invention are produced by polymerizing propylene or other suitable olefins by contact with a highly stereospecific catalyst system. A great variety of stereospecific catalysts have been described in the literature. They are generally species or modifications of the so-called Ziegler catalysts. The term "Ziegler catalyst" has come to mean, and is used herein to mean both "Zeigler type" and "Natta type" catalysts as explained in the following paragraph.

The Ziegler type catalysts may be designated "metal alkyl-reducible metal halide type," and the Natta type catalysts "preformed metal subhalide type." This terminology is used, for example, in "Polyolefin Resin Processes" by Marshall Sittig, Gulf Publishing Company, Houston, Texas, 1961. These well known catalysts are the reaction products of halides, in order to preference chlorides and bromides, of transition metals from subgroups $b$ of groups 4 and 5 of the Periodic Chart of Elements, i.e., of Ti, Zr, Hf, V, Nb or Ta, with organo metallic reducing agents in which the metal is from groups 1, 2 or 3. Preferred reducing agents are organoaluminum compounds and particularly aluminum alkyls, including aluminum alkyl halides. The most effective catalysts for the production of isotactic polypropylene known to date are those prepared from certain forms of titanium trichloride and certain aluminum alkyls and aluminum alkyl halides.

In the production of crystallizable alpha olefin polymers, the reaction mixture formed in the low pressure polymerization is treated to deactivate the catalyst, usually by contact with a polar compound such as an alcohol and/or hydrochloric acid, and is subsequently washed for removal of at least a substantial portion of the catalyst residue. The resulting polymer almost invariably contains at least traces of the catalyst residue. Typically it may contain 50 parts per million (p.p.m.) of each of the catalyst components, calculated as the corresponding metal. A carefully purified polymer may contain as little as 1 p.p.m. of each metal or less. The additives of this invention are uniquely useful in polymers which contain relatively low amounts of the residue of said catalyst components, e.g. less than 50 p.p.m. calculated as the corresponding metal, and especially in those containing from 0 to 10 p.p.m. However, they provide equally good results when used in polymers containing large amounts of catalyst residue.

Various methods may be employed for introducing the additive of this invention into the polymer. It is generally preferred to add the additive after the polymerization reaction has been completed, the active catalyst has been killed and the predominant part of the catalyst residue washed out of the polymer. The additive may, for example, be added to the washed polymerization slurry; the slurry is then dried and a dry mixture of additive and polymer is recovered. Alternatively, additive may be added to the dry polymer either when the polymer is in the form of a powder fluff or in the form of shaped pellets or the like. It is also possible to add the additive to the crystallizable polymer after it has been melted.

It is essential for effective results that a substantially homogeneous distribution of the additive in the molten polymer be obtained prior to the final crystallization of the polymer. To promote mixing of the polymer and the additive it is best to apply temperatures at which the polymer has a relatively low viscosity, i.e., a temperature exceeding the melting temperature of the polymer by from 20° to 50° C. The additives may be present in the polymer melt in true solution or in uniform dispersion, e.g., as colloidal suspensions of liquids or solids. In one mode, extreme effectiveness is obtained by using them as solids of from 0.01 to less than 1 micron diameter.

The manner in which mixing takes place provides a uniform distribution of the crystallization promoting additive in the polymer. This uniform distribution remains substantially unaffected during the crystallization, both when crystallization progresses very rapidly and when there is a considerable temperature gradient, as in the cooling of large objects.

An essential step in the process according to this invention is the cooling of the polymer containing the carboxylic acid salts as additive at conditions resulting in a crystalline polymer structure. The final cooling step in the production of a shaped article determines those of its effective properties which depend on crystal structure. Whereas in the absence of the additives of this invention slow cooling leads to formation of excessively large spherulites, and rapid cooling tends to lead to incompletely crystallized polymer, i.e., polymer having a lower degree of crystallinity than it is capable of achieving, the use of additives of this invention generally result in a polymer having a high degree of crystallinity and a fine spherulite structure regardless of whether the cooling is carried out very rapidly or over a relatively longer period of time. Rapid cooling can be carried out as quickly as heat conduction permits. This is, of course, a function of the geometry and heat removal capacity of each system. It can be completed in seconds in the production of film. Slow cooling may be carried out over a period from several minutes to several hours.

Cooling of the polymer mixture can take place in any suitable apparatus. Cooling is usually carried out in conventional apparatus associated with the production of shaped articles from olefin polymers.

Shaped articles from product according to this invention may be, for example, bars, sheets, films, bands, granules, rods or flakes, molded or extruded large or small shapes or filament. Shaped articles according to this invention may be manufactured from the mixtures according to this invention by casting, compression molding or injection molding; films may be obtained by blowing or by slit extrusion; filaments, bars, bands and the like, may be obtained by extrusion. If desired these can be reduced, by chopping, to the form of granules, chips or the like. Filaments can be stretched to obtain further improvement of properties. Other known methods of forming shaped polyolefin articles are equally adapted to use with mixtures according to this invention.

The invention will be further described by reference to the following examples, which are not to be interpreted as limiting the invention but are merely intended to be illustrative of preferred modes of practicing the invention.

One of the techniques employed for testing the effectiveness of the additives of this invention is differential thermal analysis. In this method, temperature changes of a sample of the crystallizable polymer are studied by measuring the temperature difference between the sample and an inert material as both are simultaneously heated or cooled under identical heat transfer conditions. When the polymer sample has been heated substantially above its crystallization temperature and is then cooled at a controlled rate, it is found that a point is reached at which crystallization of the supercooled polymer suddenly proceeds rapidly. The temperature of the polymer sample then rises substantially during a short period of time, due to the heat liberated by the crystallization process. The temperature at which this sudden temperature rise due to rapid crystallization is initiated in a given polymer sample is found to be much higher in the presence of crystallization modifying compounds of this invention. For example, when in the absence of crystallization modifying additives the temperature of crystallization of a given polypropylene sample is 115° C., it is found that an effective amount of an additive according to this invention, such as 0.3% by weight of sodium benzoate, causes rapid crystallization to be initiated at a temperature of about 135° C.

Another method for testing the effectiveness of the additives of this invention is by their effect on the shear modulus of the polymer. This is a well known physical property, tested by measuring the deformation of a strip of the polymer under torsion. It is affected by the crystal structure of the polymer.

In Examples 1–10, the polypropylene is of the type produced by polymerizing propylene by means of a catalyst comprising the reaction product of $TiCl_3$ and an aluminum alkyl compound at conventional low pressure polymerization conditions favoring the production of isotactic polymer. Parts and percentages are by weight unless otherwise indicated.

EXAMPLE 1

Shear modulus test bars are prepared from polypropylene nibs containing oxidation inhibitor. In one sample, 0.1% by weight of purified sodium benzoate is combined with the polymer by milling at about 225° C. In each instance the polymer is compression molded in an electrically heated mold at about 220° C. and about 1000 p.s.i. The mold is then cooled below the melting point of polypropylene by passing steam through appropriate channels in the mold.

It is found that presence of the additive results in a material which has after 2 hours the shear modulus that a sample without additive attains only after 100 hours or more, and which attains an ultimate shear modulus much higher than that of a sample without additive. This is believed to be due to modification of the crystal structure of the polymer due to presence of sodium benzoate.

EXAMPLES 2–9

To illustrate the effectiveness of various salts of various carboxylic acids, samples are studied by differential thermal analysis. The results are reported on a relative scale, in which the effect obtainable with 1% of sodium benzoate is assigned the value of 3 and proportionately lower effects the values 2 and 1. Absence of effect has the value 0.

*Table I*

EFFECT OF SALTS OF CARBOXYLIC ACIDS ON CRYSTALLIZATION OF POLYPROPYLENE

| Example | Metal | Acid | Concentration, Percent wt. | Activity |
|---|---|---|---|---|
| 2 | Na | Benzoic acid [a] | 1 | 3 |
| 3 | Na | Benzoic acid [b] | 1 | 3 |
| 4 | K | Benzoic acid [a] | 1 | 1 |
| 5 | Na | p-Tert.butylbenzoic acid | 1 | 3 |
| 6 | Ca | ---do--- | 1 | 1 |
| 7 | Mg | ---do--- | 1 | 1 |
| 8 | Na | Cyclohexane carboxylic acid. | 1 | 3 |
| 9 | Na | Diphenylacetic acid | 1 | 2 |

[a] Salt purified by extraction with benzene.
[b] Commercial grade.

I claim as my invention:
1. The method of crystallizing crystallizable polypropylene which comprises
   (A) producing a melt of
      (a) normally solid, crystallizable polypropylene containing
      (b) an effective amount, in the range from 0.0001 to 2 percent by weight, of a crystallization modifying salt $Na_mX$ where $m$ is the valence of X, and X is the anion of a carboxylic acid from the following group:
         (1) cyclic monocarboxylic acids, free of olefinic unsaturation, whose carboxyl group is attached to a carbon atom of a 5- to 6-membered ring;
         (2) polycarboxylic acids selected from the following group:
            (i) aromatic polycarboxylic acids having from 2 to 4 carboxyl groups per molecule and free of olefinic unsaturation,
            (ii) saturated cycloaliphatic dicarboxylic acids,
            (iii) saturated aliphatic and saturated hydrocarbon-substituted aliphatic terminal dicarboxylic acids having from 4 to 12 carbon atoms per molecule; and
         (3) terminal aliphatic monocarboxylic acids substituted with at least one carbocyclic group per molecule;
   (B) and solidifying said melt by cooling it.

2. The method of crystallizing a crystallizable polyolefin which comprises
   (A) producing a melt of
      (a) a normally solid, crystallizable polymer of an alpha-monoolefin having from 3 to 8 carbon atoms per molecule containing
      (b) an effective amount, in the range from 0.0001 to 2 percent by weight, of a crystallization modifying salt $Na_mX$ where $m$ is the valence of X, and X is the anion of a carboxylic acid from the following group:
         (1) cyclic monocarboxylic acids, free of olefinic unsaturation, whose carboxyl group is attached to a carbon atom of a 5- to 6-membered ring;
         (2) polycarboxylic acids selected from the following group:
            (i) aromatic polycarboxylic acids having from 2 to 4 carboxyl groups per molecule and free of olefinic unsaturation,
            (ii) saturated cycloaliphatic dicarboxylic acids,
            (iii) saturated aliphatic and saturated hydrocarbon-substituted aliphatic terminal dicarboxylic acids having from 4 to 12 carbon atoms per molecule; and
         (3) terminal aliphatic monocarboxylic acids substituted with at least one carbocyclic group per molecule;
   (B) and solidifying said melt by cooling it.

3. A method according to claim 1 wherein said carboxylic acid is a terminal aliphatic monocarboxylic acid substituted with at least 1 carbocyclic group per molecule.

4. A method according to claim 1 wherein said carboxylic acid is a monocarboxylic acid containing a carboxyl group and a hydrocarbon group substituent, both attached to a benzene nucleus.

5. A method according to claim 1 wherein said carboxylic acid is a monocarboxylic acid containing an alkyl group substituent having from 1 to 6 carbon atoms, attached to a benzene nucleus para to its carboxyl group.

6. A method according to claim 1 wherein said carboxylic acid is benzoic acid.

7. A method according to claim 1 wherein said carboxylic acid is p-tert.butyl benzoic acid.

8. A method according to claim 1 wherein said carboxylic acid is o-tert.butyl benzoic acid.

9. A method according to claim 1 wherein said carboxylic acid is diphenyl acetic acid.

10. A method according to claim 1 wherein said carboxylic acid is beta,beta-diphenylpropionic acid.

11. A method according to claim 2 wherein said polyolefin is a block polymer consisting predominantly of polypropylene and to a minor extent of other alpha-monoolefin polymer.

12. The method of producing low ash polypropylene articles of improved clarity, hardness and tensile strength which comprises
   (A) dispersing in
      (a) polypropylene having a viscosity average molecular weight of at least 40,000 and a crystallinity of at least 50 percent, as measured by X-ray analysis,
      (b) a sodium salt of benzoic acid in an amount in the range 0.001 to 1 percent by weight, based on the polymer,
   (B) melting the resulting mixture,
   (C) shaping the melt into a desired shape, and
   (D) solidifying the melt by cooling it.

13. As a manufacture, polypropylene produced by the method of claim 1.

14. As a manufacture, polypropylene produced by the method of claim 5.

15. As a manufacture, polypropylene produced by the method of claim 3.

16. As a manufacture, polypropylene produced by the method of claim 9.

17. As a manufacture, polypropylene produced by the method of claim 7.

18. As a manufacture, polypropylene produced by the method of claim 12.

References Cited by the Examiner

UNITED STATES PATENTS

| | | | |
|---|---|---|---|
| 2,838,437 | 6/58 | Busse et al. | 260—31.8 |
| 3,028,363 | 4/62 | Robbins et al. | 260—45.85 |

OTHER REFERENCES

Gaylord and Mark: "Linear and Stereoregular Addition Polymers," New York, Interscience, 1959, page 55.

Renfrew and Morgan: "Polythene," New York, Interscience, Aug. 15, 1960, page 119.

JOSEPH L. SCHOFER, *Primary Examiner.*

JAMES A. SEIDLECK, *Examiner.*